Patented Aug. 26, 1952

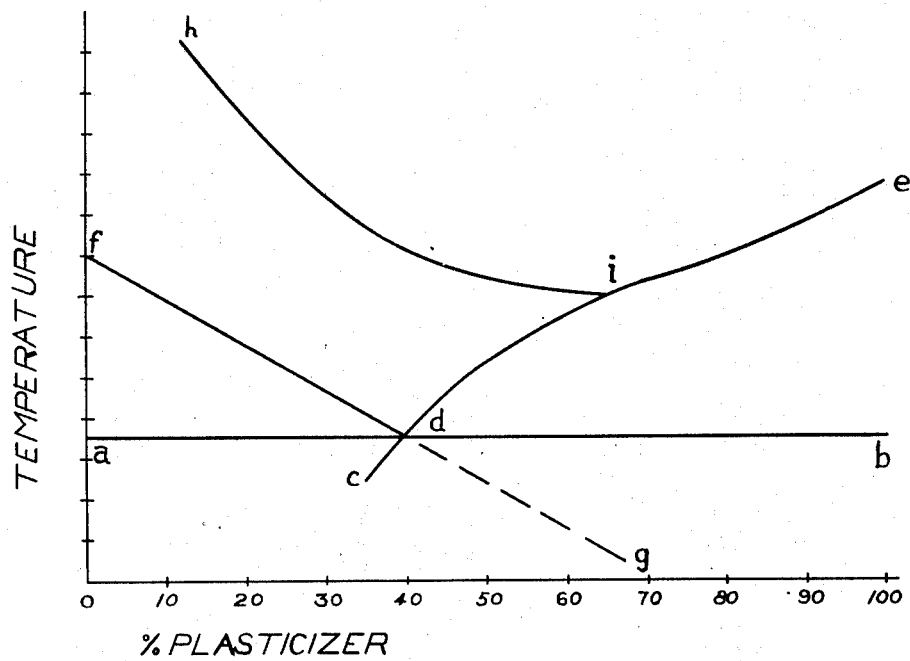

2,608,543

UNITED STATES PATENT OFFICE 2,608,543

HEAT-ACTIVATABLE DELAYED-SETTING ADHESIVE PRODUCTS

Charles M. Wiswell, Westbrook, Maine, assignor to S. D. Warren Company, Boston, Mass., a corporation of Massachusetts Application September 26, 1950, Serial No. 186,814

6 Claims. (Cl. 260—29.7)

This invention relates to heat-activatable adhesive compositions, i. e. materials which become adhesive only after heating, to sheet or other material coated therewith, and to processes for producing such adhesive compositions and products coated therewith, the novel compositions having, after heat has been applied and the composition cooled, a period during which they continue to be adhesive and after which they set permanently.

Broadly speaking heat-activatable adhesive compositions are old, such materials having been used to stick together two substances, e. g. two sheets of paper, under the combined action of heat and pressure. Adhesive materials for such use are commonly referred to simply as being "heat-sealing." In many cases, e. g. in applying a label to a glass container, it is inexpedient to apply heat while the two surfaces are in contact. Accordingly, simple heat-sealing compositions are not satisfactory for use in such cases. More recently, however, heat-activatable adhesive compositions have been developed which, when once activated or fused by heat and allowed to cool, remain adhesive thereafter for a period of greater or less extent. Sheet material, e. g. a paper label, coated with such a heat-activatable adhesive composition will possess, after the said composition has been heat-activated, and for as long as the tackiness or adhesiveness persists, many or all of the advantages of an ordinary pressure-sensitive coated sheet but at the same time avoids the expense and inconvenience attendant upon the use of a protective or carrier sheet to prevent the adhesive sheets sticking to other objects or to each other before they are used.

One prior art method of obtaining a heat-activatable adhesive coating on sheet material has been to apply first to said sheet material a coating of hard, non-crystalline, potentially adhesive material, e. g. resinous material, and then to apply over the potentially adhesive coating a coating or layer of solid crystalline plasticizer. It is found, however, that such a sheet must be held for a considerable time at fusing temperature in order for the two layers to blend sufficiently to give satisfactory results; otherwise a film of the crystalline material remaining unblended on the surface may cause unsatisfactory adhesion when the sheet material is applied to the surface to which it is expected to adhere.

Another prior art method comprises (1) grinding separately to fine particle size a hard, non-crystalline, potentially adhesive material and a solid crystalline plasticizer; (2) subsequently mechanically mixing the two powdered materials in an aqueous suspension which also contains some binding material to stick the particles to a surface on which they may be coated; (3) applying the said aqueous suspension to the surface of sheet material as a coating layer, and (4) drying the coating. Such a coating becomes adhesive when properly heated and remains so for some time, but it is found that since the particles of crystalline plasticizer present have a sharp melting point, that is, the plasticizer changes quickly from a hard solid to a thin liquid, the melted fluid plasticizer is apt to be absorbed by the sheet material unless the sheet material used is greaseproof and therefore impervious to the liquid plasticizer. Obviously restriction of the adhesive coating to use on greaseproof material is undesirable. If used on non-greaseproof stock part of the relatively expensive plasticizer may be lost by absorption and also may act to transparentize the base sheet material.

I have discovered that a satisfactory delayed action adhesive may be made by fusing together a non-crystalline adhesive substance and a crystalline plasticizer therefor and that on hardening this single fusion product may be ground and applied to sheet material as a dispersion, and on heating will become sticky and retain its stickiness for a considerable time, but on standing will adhere firmly to another object. Since in my novel composition the plasticizer does not exist in the form of separate individual particles but is incorporated with the other component in each particle, the plasticizer does not fuse independently of the other component and hence is not wasted by being absorbed in the sheet material, nor does it tend to render the sheet material transparent.

The behavior of the heat-activatable adhesive products of the invention made by fusing together resin and solid crystalline plasticizer can be described in connection with the accompanying drawing in which the figure is a diagram of solubility, brittle line, and fluidity line curves.

In the figure the ordinates represent temperature, and the abscissas represent percentage composition by weight, ranging from zero percent plasticizer at the left of the diagram to 100 percent plasticizer at the right. The curves are drawn for mixtures of a particular resin and a particular plasticizer, namely, polystyrene having a molecular weight of about 9000 and tri (para tert.-butyl phenyl) phosphate. Similar curves can be drawn for any other combination of resin and plasticizer. Naturally curves for other combinations will not coincide exactly with the curves shown but the same general pattern will be observed in all cases. Hence the diagram may be considered typical for any fusion combination of the invention.

When a resin and a solid plasticizer therefor of the type contemplated by the present invention are melted together in any proportion the result is a transparent melt having every appearance of a true solution, i. e. a molecular dispersion of solute in solvent. It appears that in this system the resin may be considered to be the solvent, and the plasticizer to be the solute. In the drawing the line $cde$ may be considered the line of solubility, saturation, or permanent compatibility. At any temperature and composition above and to the left of line $cde$ the plasticizer and resin are compatible, whereas below line $cde$ there is present a greater quantity of plasticizer than is permanently completely compatible with the resin, which sooner or later causes loss of transparency and development of cloudiness in the mixture. Given sufficient time any melt cooled to the line $cde$ will become hard and brittle. Proper manipulation may bring about such separation and consequent hardening in a short time—almost instantly. Normally, however, molten mixtures of the resin and plasticizer may be cooled considerably below line $cde$ and may be kept there in a fluid or semi-fluid condition for a considerable time before solidification occurs. While this super-cooled condition exists the plasticizer and resin remain in a state of transient or meta-stable compatibility; upon aging for a greater or less period, however, a degree of incompatibility will develop resulting in solidification and loss of transparency. The controlled use of this meta-stable compatibility is a characteristic of the process of the invention. Thus in general any mixture falling to the right of point $d$ may by proper treatment be obtained in solid form at room temperature but when again reactivated by heat it may remain in tacky, adhesive condition for some time before again becoming solid. When the plasticizer content is high, i. e. for mixtures approaching point $b$ on the room temperature line $ab$ the period of adhesiveness may be relatively short, say, a few minutes or hours; for mixtures slightly to the right of $d$ the period of adhesiveness may last for months.

Mixtures falling to the left of point $d$ in general do not exhibit the property of extended adhesiveness or delayed setting and consequently they are not useful according to this invention.

The line $fd$ is the "brittle line" given by solutions of plasticizer in resin. It may be considered to represent the line at which the resinous mass ceases to be easily friable and has softened sufficiently to be somewhat flexible. The extension of line $fd$ to $g$ is a line to which molten solutions of resin and plasticizer may be cooled while in the meta-stable state before becoming brittle. The area above $dg$ and below $die$, however, as explained above, is one of meta-stable equilibrium, because eventually, given sufficient time, the melt will solidify along line $die$. Line $dg$ may therefore be considered a temporary line of brittleness, and line $die$ the eventual or permanent line of brittleness.

Since a resin does not possess a sharp melting point there is a wide temperature difference between the point at which a resin ceases to be brittle and the point at which it is freely fluid. One way to obtain an arbitrary "fluidity temperature" of a resinous material is to sprinkle the powdered material along a heated bar having a known temperature gradient and then to observe the point on the bar at which the powdered resinous material becomes instantly transparent. The line $hie$ represents fluidity temperatures obtained in the manner described. From $i$ to $e$ the fluidity line is substantially identical with the compatibility line, since the solid fusion product will not melt until a temperature is reached at which the components are completely compatible.

From the foregoing description it is apparent that each particle obtained by powdering any solidified fusion product falling below line $fd$ will consist wholly of a solid solution of plasticizer in resin and on melting will not exhibit the phenomenon of supercooling, since it does not contain sufficient plasticizer to cause incompatibility at the temperature in question. On the other hand, every individual particle obtained by finest mechanical disintegration of a solidified fusion product falling below line $die$ will, on remelting, exhibit the phenomenon of supercooling, i. e. will become tacky on heating and retain the tackiness for some time after cooling to room temperature, since it contains plasticizer in excess of the amount which will form a solid solution at the temperature in question.

Reference to the drawing indicates that any composition falling to the right of point $d$ on line $ab$ will have a period of extended adhesiveness at room temperature for as long as the state of meta-stable equilibrium can exist before incompatibility of excess plasticizer with the resin is effective to cause solidification of the mixture. All compositions useful under the invention are characterized by possessing such meta-stable compatibility; that is, the compositions contain a greater proportion of plasticizer than is permanently compatible with the resin. In case of the polystyrene resin and tri (para tert.-butyl phenyl) phosphate plasticizer represented by the curves of the diagram, the point $d$, to the right of which only meta-stable compatibility can exist, is approximately at 40 percent plasticizer content.

The minimum plasticizer content which will yield the desired extended period of adhesiveness or delay in setting, or produce meta-stable compatibility in the mixture, will vary depending both on the particular plasticizers and the particular resins used. The following Table 1 lists various plasticizers and resins which when combined posses complete compatibility at low plasticizer content and meta-stable compatibility at higher plasticizer content. In the table the figures are the approximate percentages of the plasticizer in the compositions, by weight, above which incompatibility at room temperature may begin, and these figures correspond to point $d$ on the diagram of Fig. 1.

TABLE 1

| Resin | Plast. 1 | Plast. 2 | Plast. 3 | Plast. 4 | Plast. 5 | Plast. 6 | Plast. 7 | Plast. 8 |
|---|---|---|---|---|---|---|---|---|
| Staybelite | 10 | 22 | 24 | 25 | 25 | 27 | 27 | 35 |
| Polypale resin |  | 32 | 35 | 36 | 36 | 40 | 40 | 45 |
| Wood rosin AB |  | 30 | 33 | 34 | 34 | 38 | 37 | 42 |
| Synthetics A-56 |  | 34 | 37 | 41 | 41 | 42 | 43 | 47 |
| Polypale ester 10 |  | 39 | 43 | 35 | 35 | 46 | 45 | 55 |
| Dow PS2 |  | 40 | 40 | 40 | 40 | 40 | 40 | 40 |
| Nevindene R-3 |  | 41 | 45 | 47 | 47 | 52 | 51 | 58 |
| Pentalyn G |  | 41 | 45 | 50 | 46 | 52 | 51 | 57 |
| Synthetics A-52 |  | 45 | 49 | 51 | 51 | 56 | 55 | 63 |
| AYAC |  |  |  | 40 |  |  | 40 |  |

In the preceding table the materials mentioned may be identified as follows:

Plasticizer 1 is acetanilid.

Plasticizer 2 is a meta-terphenyl sold as "Santowax M" by Monsanto Chemical Company.

Plasticizer 3 is ortho-terphenyl sold as "Santowax O" by Monsanto Chemical Company.

Plasticizer 4 is diphenyl phthalate.

Plasticizer 5 is dicyclohexyl phthalate sold as "KP 201" plasticizer by Ohio Apex, Inc.

Plasticizer 6 is N-ethyl paratoluene sulfonamide sold as "Santicizer 3" by Monsanto Chemical Company.

Plasticizer 7 is N-cyclohexyl paratoluene sulfonamide sold as "Santicizer IH" by Monsanto Chemical Company.

Plasticizer 8 is tri (para tert.-butyl phenyl) phosphate sold as "Plasticizer 77" by Dow Chemical Company.

"Staybelite" is hydrogenated rosin sold by Hercules Powder Company.

"Polypale" resin is polymerized rosin sold by Hercules Powder Company.

"Wood rosin AB" is a grade of wood rosin sold by Hercules Powder Company.

"Synthetics A56" is an adduct of maleic anhydride and pentaerythritol ester of rosin sold by Hercules Powder Company.

"Polypale Ester 10" is a glyceryl ester of polymerized rosin sold by Hercules Powder Company.

"Dow PS2" is a polystyrene of low (about 9000) molecular weight sold by Dow Chemical Company.

"Nevindene R3" is a grade of indene resin of M. P. 150° C. sold by Neville Company.

"Pentalyn G" is a modified pentaerythritol ester of rosin sold by Hercules Powder Company.

"Synthetics A-52," more recently sold by Hercules Powder Company as "Pentalyn K" is a pentaerythritol ester of polymerized rosin acids.

"AYAC" is a low molecular weight polyvinyl acetate having a softening point of 45–60° C., sold by Carbide and Carbon Chemicals Corporation.

It is apparent from the foregoing table that in all cases except that of "Plasticizer 77" metastable compatibility exists when the plasticizer content is at least 60 percent, and in all cases it exists when the plasticizer content is 65 percent.

Important steps in practicing the invention are (1) to fuse together to a clear homogeneous fluid melt, readily fusible resin and a quantity of solid crystalline plasticizer known to be greater than that permanently compatible with said resin at room temperature, (2) to harden the melt until it is solid at room temperature, i. e. until incompatibility has developed, and (3) to powder the solid fusion product. The mass may be allowed to harden merely by cooling for a sufficient time; but if it is desired to harden the melt more rapidly the molten mass may be stirred at a temperature slightly below the lowest temperature at which complete permanent compatibility can exist, which is always somewhat below the melting point of the plasticizer and is represented by the line *die* of the diagram. For convenience of reference this lowest temperature at which complete permanent compatibility can exist will be referred to hereinafter as the "equilibrium compatibility temperature." Stirring may be continued until the fluid mass begins to stiffen. Treatment under the conditions indicated ordinarily results in solidification within a reasonable time, whereupon the solid material can readily be powdered.

When the solidified mass described is crushed or even ground to the finest particles distinguishable under a high-powered microscope, all particles appear identical.

The chief use of the compositions of the invention is to provide heat-softening, delayed setting adhesives which, after being heated, are adhesive when pressure is applied and will retain such adhesive properties for some time following heating.

Compositions embodying the invention can in general be activated at somewhat lower temperatures than those of the prior art; they need to be held at the fusion temperature for a shorter time; and, in the case of paper coated with compositions of the invention, less adhesive material is lost by absorption into the paper.

It is likewise found that compositions of the invention have valuable properties for use in cases where simple heat-sealing techniques are followed. Here again a lower temperature for a shorter period is effective in activating compositions of the invention in comparison with customary heat-sealing adhesives.

A very important use for the powdered fusion products of the invention is in aqueous coating compositions to be applied to paper or other sheet material to form a heat-activatable adhesive coating thereon whereby said paper or other sheet material may readily be attached to another surface as desired. The problems involved in preparing and applying such a coating to sheet material are in general similar to those known in the art of applying aqueous coating compositions. When the powdered resinous fusion composition has once been wet with aqueous fluid it is surprising how greatly coating compositions made therewith resemble ordinary clay coating compositions. As binders to bind the powder to the surface coated therewith there may be used the identical binders commonly used in making clay coated papers, and in approximately the same amounts. The aqueous compositions so made may have approximately the same percentage of solids content as usual clay coating compositions, and they may be applied to paper by the same coating methods and in substantially the same amounts as is customary with such clay coating compositions.

Ordinarily the powdered adhesive material deposited on a sheet from a water dispersion thereof will not adhere firmly to the sheet but may fall off during handling. Accordingly it is desirable to add a binder to the coating compositions as is done with clay coatings and the like, but the quantity of binder used is not particularly critical. It is in general found sufficient to bind 100 parts of powdered resinous matter if there is used from 4 to 10 parts of polyvinyl alcohol, dextrin, modified starch, solubilized, casein, solubilized soy protein, or animal glue, but it is preferred to use binders that are themselves resinous in nature, and which may even blend with or at least be acted on by the molten plasticized resinous material, since such binders interfere less with the heat-activation of the coating.

Some binders of a resinous nature which are sometimes used in clay coatings and which have been found suitable for use to bind the heat-activated resinous powder are various primary emulsions of emulsion polymerized styrene-butadiene copolymer, styrene-isoprene copolymers, butadiene-acrylonitrile copolymers, copolymerized acrylonitrile and methyl acrylate, and the like, as well as natural rubber latex which in general is not a satisfactory adhesive for ordinary clay coated printing paper. Of these, consideration of costs indicate the use of styrene-butadiene copolymers; a very satisfactory grade of the latter is the commercial product sold by The Dow Chemical Company as "No. 512K latex." Since a film of the styrene-butadiene copolymer may itself be rather soft and inclined to a tendency to "block," it is advantageous to harden the binder somewhat by combining a harder polymer with the styrene-butadiene copolymer. Excellent results are produced by using equal parts by weight of styrene-butadiene copolymer and emulsion polymerized polystyrene of high (about 80,000) molecular weight. Such an adhesive may be referred to as a rubbery emulsion polymer of a composition containing an ethylenically unsaturated monomer.

The emulsion polymerized elastomers mentioned above as desirable binding agents are sometimes called "primary emulsions," indicating that the dispersion has been formed by polymerization in situ, in contra-distinction to "secondary dispersions" formed by redispersion of agglomerated matter in an aqueous medium. Obviously dispersions of the powdered resinous fusion products of the invention are secondary dispersions. The preferred coating compositions of the invention, therefore, comprise in an aqueous medium a secondary dispersion of a friable high-plasticizer resinous fusion product each particle of which contains solid plasticizer in excess of that compatible with the resin, a dispersing agent, and a rubbery emulsion-polymer of a composition containing an ethylenically unsaturated monomer, the latter constituent in general not exceeding 25 percent by weight of the total solids present in the coating composition.

The resin-plasticizer fusion products of the invention are ordinarily not wettable by water. Consequently some dispersing agent must be used to disperse the powdered resinous masses in an aqueous medium. The particular type of dispersing agent used is not too important. Anionic dispersing agents such as soaps or resinates of ammonium, caustic soda, morpholine, ethanolamine, and the like, are very satisfactory; on the other hand, cationic agents, such as lauryl pyridinium chloride, also give good results; and non-ionic dispersing agents may also be used, such as various aryl alkyl polyether alcohols, e. g., an isooctyl phenyl ether of polyethylene glycol. It is found in practice that it is advantageous to use as dispersing agent the product formed by treating with ammonia, or other alkali such as caustic soda, a resin of high acid number such as the "Synthetics A56" resin of Table I.

The following Example 1 describes one embodiment of the invention.

Example 1

A fusion was made of 75 parts by weight of diphenyl phthalate (a solid plasticizer), 25 parts by weight of polystyrene of 6000 molecular weight (a resin) and 1 part by weight of solid commercial octadecanol (to aid in dispersing the product), a temperature of over 300° F. being reached. The melted mixture was poured on a cold slab to solidify. It was allowed to stand for six days and the solid product was then crushed; 100 parts by weight of the product was put into a ball-mill containing 75 parts by weight of water and 0.25 part by weight of tetrasodium pyrophosphate; and the mixture was ball-milled for four hours. The mixture was then removed from the mill and mixed with 44.5 parts by weight of an aqueous emulsion of emulsion polymerized 60:40 styrene-butadiene copolymer. The resulting coating composition was applied by means of an air-knife coater to the reverse side of a one-side glossy coated commercial printing paper, the dry weight of coating applied being about four pounds per 1000 square feet of surface coated. The coated paper was dried at room temperature. The final product was readily activatable by heat, and when so activated remained adhesive or tacky for several days. The activated product was adherent to glass, metal and paper surfaces.

Preceding Example 1 was a satisfactory product, but the technique shown in following Example 2 is preferred over that of Example 1.

Example 2

A fusion was made of the following ingredients: 92 diphenyl phthalate, 8 indene resin of M. P. 150° C., and the temperature was raised to somewhat over 300° F. to ensure complete fusion and blending. The molten mass was then cooled rather rapidly to about 150° F., and was then allowed to cool slowly thereafter while it was kept constantly stirred. At somewhat above 130° F. stirring was terminated and the still liquid mass was poured upon a cold metal slab, where it quickly became solid. The solidified fusion product was then ground to a powder in a hammer-mill. Then 100 parts by weight of the powdered fusion product was weighed out for use.

A mixture was made of 3.75 parts by weight of water, .75 parts by weight of strong ammonia water, and 1.5 parts by weight of the "Synthetics A56" of Table I. This mixture formed a clear solution; its function was to act as a wetting or dispersing agent to help disperse the powdered resinous material in aqueous medium. This solution was then added to a mixture of 77 parts by weight of water to which were added in succession 20 parts by weight of a 45 per cent solids emulsion of an emulsion polymerized 60:40 styrene butadiene copolymer, followed by 24 parts by weight of a 40 percent solids emulsion of emulsion polymerized polystyrene of high molecular weight. To this aqueous mixture, while it was being well agitated, was then added the 100 parts by weight of the powdered fusion product mentioned above. The whole charge was put into a ball-mill and ground for several hours, the grinding action serving completely to disperse the resinous powder in the aqueous medium as well as to decrease somewhat further the size of the particles of the resinous fusion product.

When the aqueous mixture was withdrawn from the ball-mill it was then applied by means of a conventional air-knife coating-machine to the uncoated side of a commercial grade of clay-coated label paper. The dry weight of coating applied amounted to about four pounds per thousand square feet of surface coated. The paper so coated was dried at a temperature below 125° F. to avoid activation of the coating. The finished product was readily activatable by heat, and when so activated remained in adhesive or pressure-sensitive condition for several hours. The activated adhesive paper was applied successfully to various surfaces including glass, metal and regenerated cellulose sheet The procedure described in Example 2 can be used satisfactorily with any of the other powdered high-plasticizer fusion products described herein. Dispersing agents and primary emulsions of elastic adhesives other than those used in Example 2 can be used without greatly changing the results.

A solid plasticizer to be useful according to the invention (1) must be completely compatible with the particular resin used at temperatures above the melting point of the plasticizer, (2) must be incompletely compatible therewith at room temperature in a mixture containing between 80 and 95 percent of the plasticizer, and (3) must by itself be characterized by a degree of supercooling after melting. It appears probable that it is the combined effect of the tendency toward supercooling possessed by the plasticizer and the increased viscosity imparted by the resin which produces the desired prolonged tackiness at room temperature after the product has been heat-activated.

Typical solid plasticizers useful in preparing the compositions of the invention are listed below in Table 2.

TABLE 2

Acetanilide
Dicyclohexyl phthalate
Diphenyl phthalate
N-cyclohexyl paratoluene sulfonamide
N-ethyl paratoluene sulfonamide
Tri (para tert.-butyl phenyl) phosphate The very many resins suitable for use include both synthetic resins that become readily fluid when fused as well as resins of vegetable origin both in their natural state or in modified condition. A few of the many suitable resins are listed in Table 3.

TABLE 3

Indene resin of M. P. 150° C.
Polyvinyl acetate having a softening point between 40 and 60° C.
Polystyrene of molecular weight about 9000.
"Pentalyn G"
"Polypale Ester 10"
"Staybelite"
"Synthetics A-56"
Kauri Copal
Mastic resin
Sandarac resin
Rosin
Ester gums, or glyceryl esters of natural resins such as rosin or copal.

As previously discussed, the period of delay in setting or of prolonged adhesiveness after heat-activation may, in the products of the invention, be widely varied by variations in the ratio of plasticizer to resin used. Likewise variations in the length of the period of delay or prolonged adhesiveness may be obtained by varying the particular plasticizer and/or the particular resin used. The following Table 4 shows a considerable range of delay periods which may result from merely changing the particular resin and/or plasticizer used in the fusion.

TABLE 4

| Example | Plast. 1 | Plast. 2 | Plast. 3 | Resin 1 | Resin 2 | Resin 3 | Resin 4 | Delay Period |
|---|---|---|---|---|---|---|---|---|
| 3 | 85 | | | 10 | | | 5 | 24 hrs. |
| 4 | | 85 | | | 10 | | 5 | 48 hrs. |
| 5 | | | 85 | | | 10 | 5 | 5 days. |
| 6 | | | 85 | | 10 | | 5 | 6 days. |
| 7 | | | 85 | 10 | | | 5 | 9 days |

(In the foregoing examples the parts are by weight.)

In the foregoing Table 4:
Plasticizer 1 is N-ethyl paratoluene sulfonamide.
Plasticizer 2 is tri (para tert.-butyl phenyl) phosphate.
Plasticizer 3 is N-cyclohexyl paratoluene sulfonamide.
Resin 1 is indene resin, M. P. 150° C.
Resin 2 is "Pentalyn G."
Resin 3 is "Polypale ester No. 10."
Resin 4 is "Synthetics A-56."

Each example of Table 4 was prepared by making a fusion of the ingredients shown, cooling, and powdering the mass after hardening thereof. It is to be noted that in the examples of Table 4 the proportions used are the same in all cases, the differences being only in the particular plasticizers or resins used. In Examples 3 and 7 the same resin is used in both cases, but different plasticizers are used. In Examples 5, 6 and 7 the same plasticizer is used in every case, but different resins are used.

It will be noted that each of Examples 3 to 7 in Table 4 shows use of 85 parts of plasticizer to 15 parts of resin. In each case, if the plasticizer to resin ratio is changed to about 80 parts of plasticizer to 20 parts of resin the delay period will at least be doubled.

As has previously been pointed out, any composition of the invention which falls to the right of the point $d$ on the diagram of Fig. 1 will be capable of exhibiting prolonged adhesiveness or delayed setting after having been heat-activated. The point $d$, depending upon the particular resin-plasticizer combination chosen, may vary widely, as is shown in Table 1; and for any new combination of plasticizer and resin may be easily determined by experiment. The low limit of plasticizer content in the fusion products of the invention may therefore be considered to be the percentage represented by the point $d$ of the diagram for the particular resin-plasticizer combination under consideration. For practical purposes the feasible upper limit of plasticizer content is 95 percent. Compositions of higher plasticizer content, and even the plasticizer alone as has been previously pointed out, will exhibit some degree of prolonged adhesiveness or supercooling after having been fused; but such compositions are of no interest according to the invention because of the insignificant degree of adhesive strength which they possess.

From the foregoing it should be apparent that the powdered fusion products of Examples 3 to 7 inclusive, previously set forth, may be incorporated in aqueous coating compositions with dispersing agents and binding material as described in Examples 1 and 2. Other useful fusion products are shown in following Table 5.

TABLE 5

Example 8:
80 Diphenyl phthalate
10 Polystyrene of mol. wt. about 9000
10 "Synthetics A-56"

Example 9:
80 N-cyclohexyl paratoluene sulfonamide
15 "Polypale Ester 10"
5 "Synthetics A-56"

Example 10:
80 Tri (para tert.-butyl phenyl) phosphate
15 "Pentalyn G"
5 "Synthetics A-56"

Example 11:
80 Dicyclohexyl phthalate
10 "Polypale Ester 10"
10 Polystyrene of mol. wt. about 9000

Example 12:
85 N-cyclohexyl paratoluene sulfonamide
15 Polyvinyl acetate of softening point 50° C.

Example 13:
50 Diphenyl phthalate
50 "Staybelite" resin (In the foregoing examples the parts are by weight.)

While the fusion product of the invention is particularly adapted for use in powdered form as an ingredient in aqueous coating compositions containing added binding material, nevertheless the solidified fusion product either before or after being reduced to powder had utility by itself, either for use in a hot-melt coating composition, or for sale as an intermediate product.

I claim:

1. A coating composition which comprises an aqueous dispersion of finely divided particles of a solid substance which is the solidified fusion product of resinous adhesive material with a quantity of a solid plasticizer in excess of that permanently compatible with the resin at room temperature.

2. A coating composition which comprises an aqueous dispersion of finely divided particles of a solid substance which is the solidified fusion product of resinous adhesive material with a quantity of a solid plasticizer in excess of that permanently compatible with the resin at room temperature and a water-dispersible adhesive substance in quantity sufficient to bind the said particles to the surface to which the coating is to be applied.

3. Sheet material having on one side a coating comprising the dried residue of the coating composition defined in claim 1.

4. Paper having on one side a heat-activatable adhesive coating which comprises finely divided, identically composed, individually discrete particles of the product resulting from fusion of resin with a solid plasticizer in excess of that permanently compatible with the resin at room temperature and an elastomeric binder therefor, said coating being capable of being activated by application of heat to become adhesive and pressure-sensitive and, when once so activated, of remaining in adhesive and pressure-sensitive condition at room temperature for at least several minutes.

5. A coating composition which comprises in aqueous dispersion a potentially heat-activatable component comprising finely divided particles of a solidified fusion product of from 80 to 85 parts by weight of N-cyclohexyl paratoluene sulfonamide and from 20 to 15 parts by weight of resin, and a binding component comprising a rubbery emulsion polymer of a composition containing an ethylenically unsaturated monomer, the dry weight of said rubbery polymer being not over 25 parts to each 100 parts of said solidified fusion product.

6. A paper product comprising a sheet of paper having on one side a heat-activatable coating comprising the dried residue of the coating composition of claim 5.

CHARLES M. WISWELL.

REFERENCES CITED

The following references are of record in the file of this patent:

UNITED STATES PATENTS

| Number | Name | Date |
|---|---|---|
| 2,462,029 | Perry | Feb. 15, 1949 |